United States Patent [19]

Diesel

[11] Patent Number: 5,779,325
[45] Date of Patent: Jul. 14, 1998

[54] FLUID CONTROL CIRCUIT AND BRAKE SYSTEM

[75] Inventor: Stuart Gavin Diesel, Brighton, United Kingdom

[73] Assignee: Twiflex Limited, Twickenham, United Kingdom

[21] Appl. No.: 685,593

[22] Filed: Jul. 18, 1996

[30] Foreign Application Priority Data

Jul. 22, 1995 [GB] United Kingdom ............... 9515062

[51] Int. Cl.⁶ ................................................ B60T 15/46
[52] U.S. Cl. .................... 303/72; 303/3; 303/15; 188/170
[58] Field of Search ................ 303/87, 72, 84.1, 303/74, 3, 15, 10, 20, 900; 188/170

[56] References Cited

U.S. PATENT DOCUMENTS 4,120,540  10/1978  Devlieg ......................... 303/15
5,401,086  3/1995   Nishikimi et al. ............... 303/87

FOREIGN PATENT DOCUMENTS 30 37 465 A1  7/1981  Germany.
2151 321      7/1985  United Kingdom.

*Primary Examiner*—Lee W. Young
*Attorney, Agent, or Firm*—Spencer & Frank

[57] ABSTRACT

A fluid control circuit (10) for operation of a brake comprises a first circuit part (11) including an actuator (12) having a chamber (13) and an operating part (14), the operating part (14) being movable to release or apply the brake when fluid under an operating pressure is fed to the chamber (13), an arrangement (17) to expel fluid from the chamber (13) when the operating pressure is released, thus to apply or release the brake, a second circuit part (18), a control valve (20) operable in a first condition to permit fluid to pass under the operating pressure to the chamber (13) of the actuator (12) in the first circuit (11) part and when in a second condition to permit fluid to pass from the first circuit part (11) into the second circuit part (18), the second circuit part (18) further comprising a buffer (23) to which fluid pressure is communicated from the first circuit part (11) when the control valve (20) is moved to its second condition, and a proportional fluid valve (30) to control the flow of fluid passing to tank (31) from the second circuit part (18) in dependence upon the pressure of fluid in the second circuit part.

12 Claims, 1 Drawing Sheet

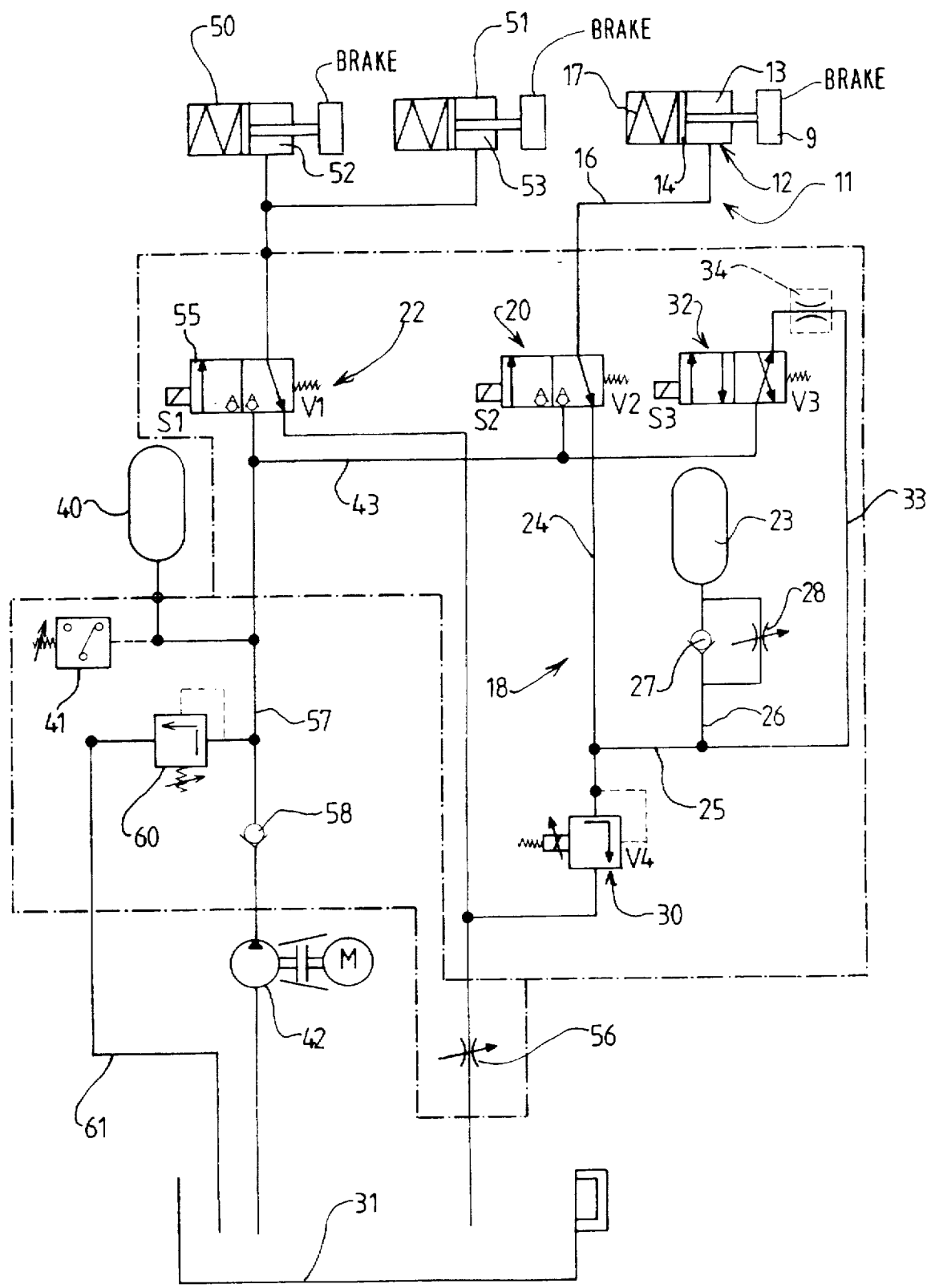

FLUID CONTROL CIRCUIT AND BRAKE SYSTEM

BACKGROUND OF THE INVENTION

This invention relates to a fluid control circuit for operation of a brake and more particularly for releasing or applying a brake which is applied or released by for example, spring means.

In a fluid control circuit for operation of a spring applied brake in which fluid is utilised to release the brake, there are two particular problems. The first is that when the brake is applied, in the absence of any control, fluid would be expelled from the actuator by the action of the spring means very quickly. Thus the brake would be applied by the spring means in an uncontrolled manner.

Efforts to overcome this problem have included the utilisation of simple fluid restrictors to restrict the flow of fluid to tank, from the actuator. However use of such a restrictor is not an ideal solution because such a restrictor would allow the entire pressure to the actuator, to be relieved. Another proposal has been to use a proportional fluid valve in the line from the actuator to tank, but the fluid from the actuator can be expelled at such a rapid rate that the proportional valve is essentially swamped and it does not release the fluid to tank in a controlled manner.

The second problem is that it is desirable to maintain some fluid pressure at the actuator so that it is not necessary when releasing the brake the next time, to have to pressurise the actuator from essentially a nil pressure, up to the operating pressure. By using a proportional fluid valve, this can be achieved, but where the actuator is relieved for a prolonged period, pressure can leak away to the tank in any event.

SUMMARY OF THE INVENTION

According to one aspect of the invention there is provided a fluid control circuit for operation of a brake comprising a first circuit part including an actuator having a chamber and an operating part, the operating part being movable to release or apply the brake when fluid under an operating pressure is fed to the chamber, means to expel fluid from the chamber when the operating pressure is released, thus to apply or release the brake, a second circuit part, a control valve operable in a first condition to permit fluid to pass under the operating pressure to the chamber of the actuator in the first circuit part and when in a second condition to permit fluid to pass from the first circuit part into the second circuit part, the second circuit part further comprising a buffer means to which fluid pressure is communicated from the first circuit part when the control valve is moved to its second condition, and a proportional fluid valve to control the flow of fluid passing to the tank from the second circuit part in dependence upon the pressure of fluid in the second circuit part.

Thus the present invention provides a fluid control circuit which utilises a proportional fluid valve to provide for controlled pressure relief from the chamber, but any risk of the proportional fluid valve being swamped due to rapid expulsion of fluid from the actuator, is overcome by providing the buffer means which essentially absorbs excess fluid pressure in the second circuit part immediately after the control valve is moved to its second position.

Fluid can then be leaked from the second circuit part to the tank in a controlled manner by the proportional fluid valve.

The circuit may include a third circuit part comprising a source of fluid, with there being some means to permit of fluid communication between the second and third circuit parts at least when the control valve is in its second position.

Thus in the event that the control valve is maintained in its second position for a prolonged period such that the pressure in the second circuit part is relieved to such an extent that the fluid pressure in the first circuit part falls below a desired minimum level, fluid from the third circuit part can flow into the second circuit part to maintain the pressure in the first and second circuit parts above the desired minimum level. Thus, when it is desired to provide fluid to the actuator again, the fluid in the first circuit part will already be at a pressure above the desired minimum level.

The means which permit of fluid communication between the second and third circuit parts may comprise an auxiliary valve which when in a first condition prevents fluid communication between the third and second circuit parts and when in a second condition permits of such fluid communication.

Preferably the auxiliary valve is synchronised with the control valve such that when the control valve is moved to its first condition, the auxiliary valve moves to its first condition and when the control valve is moved to its second condition the auxiliary valve moves to its second condition.

The means which permit of fluid communication between the second and third circuit parts may include a throttle means to restrict the flow of fluid from the third to the second circuit parts. Thus, preferably a balance will be obtained between the flow of fluid from the third circuit part into the second circuit part, and the flow of fluid from the second circuit part to tank via the proportional valve.

The third circuit part may comprise a source of fluid at at least the operating pressure and the control valve, when in its first condition, may permit fluid to flow from the third circuit part to the first circuit part at the operating pressure. Thus the third circuit part may comprise a fluid reservoir capable of delivering fluid at the operating pressure to the first circuit part and hence to the chamber of the actuator, when the operating valve is moved to its first condition.

Preferably the third circuit part comprises a fluid pump to replenish the reservoir with fluid when the fluid pressure in the third circuit part falls below a threshold value.

The buffer means of the second circuit part may comprise a vessel the pressure in which increases when fluid pressure is communicated thereto when the control valve is moved to its second position.

Throttle means may be provided to restrict the flow of fluid from the buffer means as the proportional valve permits fluid to pass from the second circuit part, to tank. Thus any risk of the buffer means itself swamping the proportional fluid valve, is avoided.

In a preferred embodiment, the means to expel fluid from the chamber of the actuator when the operating pressure is released, comprises a spring means which acts on the operating part of the actuator.

According to a second aspect of the invention we provide a brake system comprising a brake which is operated by a fluid control circuit according to any one of the preceding claims.

BRIEF DESCRIPTION OF THE DRAWINGS

The invention will now be described with reference to the accompanying drawing which is a diagrammatic illustration of a fluid control circuit in accordance with the invention.

DESCRIPTION OF THE PREFERRED EMBODIMENT

Referring to the drawing, there is shown a fluid control circuit 10 for operation of a brake 9. The circuit comprises a first circuit part 11 which includes a brake actuator 12. The actuator 12 has a chamber 13 for fluid, and an operating part 14. The operating part 14 is movable to apply or release the brake 9 when fluid under an operating pressure is fed to the chamber 13 along a line 16. In this example, a spring 17 acts on the operating part 14 normally to urge the operating part to the right as seen in the drawings, to expel fluid from the chamber 13, at least when an operating fluid pressure to the chamber 13 is released, thus to apply or release the brake.

The circuit 10 further comprises a second circuit part 18. Between the first circuit part 11 and second circuit part 18, there is a control valve 20 which is operable when in a first condition, opposite to that seen in the drawing, to permit fluid to pass under the operating pressure from a third circuit part 22 through the valve 20 to the first circuit part 11, and the control valve 20 being operable when in a second condition as seen in the drawings, to permit fluid to pass from the first circuit part 11 into the second circuit part 18.

The second circuit part 18 comprises a buffer means 23 which comprises in this example, a vessel. Fluid may pass from the first circuit part 11 via the valve 20 when the control valve 20 is in its second condition as shown, via a main line 24, and a feed line 25, and hence to a buffer line 26, and hence via a one way valve 27. Fluid may pass from the buffer vessel 23 back into the buffer line 26 via a throttle 28 as hereinafter described.

The second circuit part 18 further comprises a proportional fluid valve 30, which controls the flow of fluid passing therethrough to tank 31, from the second circuit part 18 in dependence upon the pressure of fluid in the second circuit part 18. The proportional fluid valve 30 is essentially of a conventional construction.

It will be appreciated that when the control valve 20 is moved from its first to its second condition, particularly where the spring 17 has great strength, fluid will be expelled from the chamber 13 and from the first circuit part 11, through the valve 20 to the second circuit part 18, very rapidly. In the absence of the buffer vessel 23, this fluid could swamp the proportional fluid valve 30 such that the proportional fluid valve 30 would not permit the fluid pressure of the second circuit part 18, to leak away to tank 31 in a controlled manner.

However by providing the buffer vessel 23, any surge of fluid pressure is communicated to the buffer vessel 23 which then releases that pressure in a controlled manner, via throttle 28, so that the proportional fluid valve 30 is not swamped, but releases the fluid pressure to tank 31 in a controlled manner.

Hence movement of the operating part 14 of the actuator 12 to apply or release the brake, is controlled.

It will be appreciated that when the control valve 20 is moved to its second condition for a prolonged time, the pressure in the first and second circuit parts 11 and 18, could leak entirely away to tank 31 due to the nature of the proportional valve.

In order to maintain a minimum pressure in the first 11 and second circuit parts 18, there is provided a means comprising an auxiliary valve 32, to permit of fluid communication between the third 22 and second 18 circuit parts, at least when the control valve 20 is in its second position.

In the example shown, the auxiliary valve 32 is synchronised with the control valve 20 such that when the control valve 20 is moved to its first condition, the auxiliary valve 32 moves to its first condition and when the control valve 20 is moved to its second condition, the auxiliary valve 32 moves to its second condition too.

When the auxiliary valve 32 is in its first condition it will be appreciated that in the example shown there is no fluid communication permitted between the third 22 and second 18 parts of the control circuit.

Both of the control 20 and auxiliary 32 valves are preferably solenoid operated in synchronism as described, but could be mechanically coupled if desired, so as to operate as described, and may be mechanically actuated.

Fluid communication from the third 22 to second 18 circuit parts is via a line 33 which includes a throttle 34. The throttle 34 restricts the flow of fluid from the third 22 to the second 18 circuit parts so that the leakage of fluid under pressure from the second circuit part 18 to tank 31 via the proportional fluid valve 30 is balanced by incoming fluid via the auxiliary valve 32 and line 33. Hence the fluid pressure in the second circuit part 18, and because of its communication with the first circuit part 11 via the control valve 20, the first circuit part 18 too, is maintained above a minimum level. Hence when subsequently the control valve 20 is moved to its first condition, there is already a minimum pressure in the first circuit part 11.

The third circuit part 22 comprises a main reservoir 40 or accumulator, which in practice, is of much greater volume than the buffer vessel 23 of the second circuit part 18. As soon as the fluid pressure in the main accumulator 40 falls below a threshold level a pressure switch 41 actuates a fluid pump 42 which draws fluid from the tank 31 to replenish the main accumulator 40. Hence when the control valve 20 is moved to its first condition, fluid pressure from the main accumulator 40 passes via a line 43 to the control valve 20 and hence to the first circuit part 11.

In the example shown, the brake system as a whole includes a pair of further auxiliary brake actuators 50 and 51 which are of broadly similar construction to actuator 12, each of which having a respective chamber 52 and 53 to which fluid under pressure is fed, from the third circuit part 22 via an auxiliary control valve 55 when the auxiliary control valve 55 is in a first condition opposite to that shown in the drawing. The actuators 50 and 51 operate a different brake than the actuator 12.

When the auxiliary control valve 55 is moved to its second condition as shown, fluid can pass from the auxiliary brake actuators 50 and 51 through the valve 55 to tank 31 via a throttle 56 which acts to restrict the rate of flow of fluid flow to tank 31. It can be seen that fluid from the proportional fluid valve 30 from the second circuit part 18 also passes through restrictor 56. Restrictor 56 is the only control on the flow of fluid from the auxiliary brake actuators 50 and 51, and hence these actuators 50 and 51 operate in accordance with the prior art.

It can be seen that in the line 57 between the pump 42 and the accumulator 40 (and the control valve 55) there is provided a one way valve 58 to prevent fluid being returned to tank 31 via the pump 42. There is however a return valve 60 which permits the return to tank 31 of fluid from line 57 via a line 61, if an excess pressure occurs in line 57.

Various modifications may be made without departing from the scope of the invention. For example, in the embodiment described, fluid to replenish the second 18 and first 11 circuit parts is obtained from the third circuit part 22 which also provides for a source of fluid at operational pressure to the actuator 12 when the control valve 20 is in its first condition. In another embodiment, an alternative source of fluid to the second 18 and/or first 11 circuit parts may be provided when the control valve 20 is in its second condition.

The features disclosed in the foregoing description, or the following claims, or the accompanying drawings, expressed in their specific forms or in terms of a means for performing the disclosed function, or a method or process for attaining the disclosed result, as appropriate, may, separately or in any combination of such features, be utilised for realising the invention in diverse forms thereof.

I claim:

1. A fluid control circuit for operation of a brake comprising a first circuit part including an actuator having a chamber and an operating part, the operating part being mechanically connected to the brake and movable to release or apply the brake when fluid under an operating pressure is fed to the chamber, means to expel fluid from the chamber when the operating pressure is released, thus to apply or release the brake, a second circuit part, a control valve operable in a first condition to permit fluid to pass under the operating pressure to the chamber of the actuator in the first circuit part and when in a second condition to permit fluid to pass from the first circuit part into the second circuit part, the second circuit part further comprising a buffer means to which fluid pressure is communicated from the first circuit part when the control valve is moved to its second condition, and a proportional fluid valve to control the flow of fluid passing to a tank from the second circuit part in dependence upon the pressure of fluid in the second circuit part.

2. A circuit according to claim 1 wherein there is provided a third circuit part comprising a source of fluid, and there being means to permit of fluid communication between the third and second circuit parts at least when the control valve is in its second condition.

3. A circuit according to claim 2 wherein the means which permit of fluid communication between the third and second circuit parts comprises an auxiliary valve which when in a first condition prevents fluid communication between the third and second circuit parts and when in a second condition permits of such fluid communication.

4. A circuit according to claim 3 wherein the auxiliary valve is synchronised with the control valve such that when the control valve is moved to its first condition, the auxiliary valve moves to its first condition and when the control valve is moved to its second condition the auxiliary valve moves to its second condition.

5. A circuit according to claim 2 wherein the means which permit of fluid communication between the third and second circuit parts includes a throttle means to restrict the flow of fluid from the third to the second circuit parts.

6. A circuit according to claim 2 wherein the third circuit part comprises the source of fluid at at least the operating pressure and the control valve, when in its first condition permits fluid to flow from the third circuit part to the first circuit part at the operating pressure.

7. A circuit according to claim 2 wherein the third circuit part comprises a fluid reservoir.

8. A circuit according to claim 7 wherein the third circuit part comprises a fluid pump to replenish the reservoir with fluid when the fluid pressure in the third circuit part falls below a threshold value.

9. A circuit according to claim 1 wherein the buffer means of the second circuit part comprises a vessel the pressure in which increases, when fluid pressure is communicated thereto when the control valve is moved to its second position.

10. A circuit according to claim 1 wherein throttle means are provided to restrict the flow of fluid from the buffer means as the proportional valve permits fluid to pass from the second circuit part, to the tank.

11. A circuit according to claim 1 wherein the means to expel fluid from the chamber of the actuator when the operating pressure is released, comprises a spring means which acts on the operating part of the actuator.

12. A brake system comprising a brake which is operated by a fluid control circuit according to claim 1.

* * * * *